July 20, 1937.    H. J. MERZ    2,087,440
ANIMAL TRAP
Filed Jan. 23, 1936
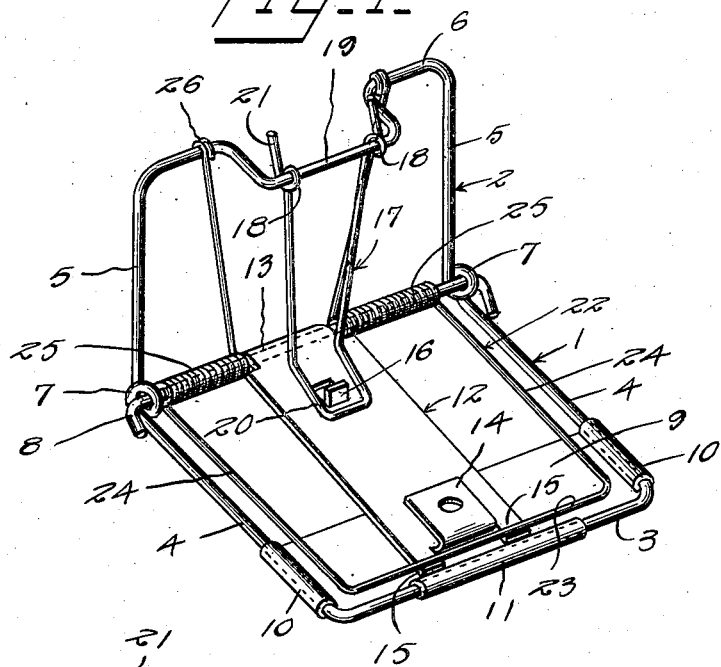
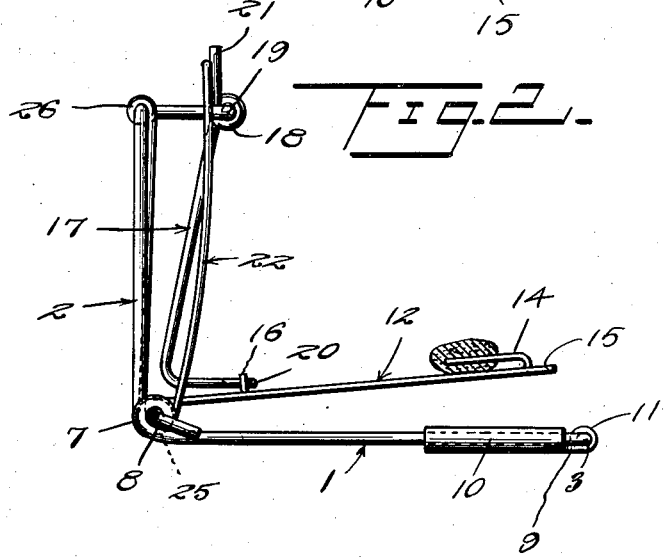
Inventor
H.J.Merz
By Watson E. Coleman
Attorney Patented July 20, 1937

2,087,440

UNITED STATES PATENT OFFICE 2,087,440

ANIMAL TRAP

Henry J. Merz, Beardstown, Ill.

Application January 23, 1936, Serial No. 60,497

5 Claims. (Cl. 43—81)

This invention relates to the class of trapping and pertains particularly to an improvement in a trap designed for catching small animals of the nature of mice.

The primary object of the present invention is to provide a trap having a striking element in which novel means is employed for delicately holding the element whereby it may be easily released and will be effective in killing the animal for which it is set.

Another object of the invention is to provide an animal trap of the above described character wherein the bait holding mechanism is so arranged that the animal must assume such a position in attempting to get the bait that it cannot escape being struck by the spring controlled striking element when the latter is released.

Still another object of the invention is to provide an animal trap wherein novel means is employed for effecting the release of the animal without the necessity of touching the same or parts of the trap close thereto.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no departure from the salient features of the invention as expressed in the appended claims.

In the drawing

Figure 1 is a view in perspective of a trap embodying the present invention.

Fig. 2 is a view in side elevation of the trap showing the same set.

Referring more particularly to the drawing wherein like numerals of reference designate corresponding parts throughout the several views, the trap comprises, as shown, two right angularly related frames 1 and 2, the frame 1 constituting the base while the vertical frame constitutes the trigger carrying mechanism. While the base and trigger supporting frame may be formed in any suitable manner, it is preferred that they be fashioned from wire material of sufficient rigidity, and it will be seen that a single piece of wire may be employed to form the front and side bars 3 and 4 respectively of the base frame, and the side or upright bars 5 and top cross bar 6 respectively of the vertical frame. At the angle formed between the side bars 4 of the base and the vertical bars 5, the material is looped to form an eye 7, and these eyes are connected by a transverse corner bar 8, the ends of which pass through the eyes and are bent in a manner to prevent the bar slipping therefrom.

The base plate 9 is disposed across the forward part of the base frame 1 and is provided at each end with a sleeve 10 through which the side bar 4 passes and along its front edge with a sleeve 11 through which the front or cross bar 3 of the base frame passes. This base plate serves as a support for the forward end of the bait pan which is indicated generally by the numeral 12 and which, as shown, is relatively long and narrow and has a sleeve 13 at its rear end through which the corner bar 8 passes so that the bait pan oscillates in a vertical plane upon this bar. At its forward end the bait pan is formed with a back-turned tongue 14 which is spaced from the body of the pan as shown in Fig. 2 and which constitutes a means for retaining a piece of bait in position thereon. This tongue 14 is bent along a line which is disposed transversely of the bait pan and inwardly of the forward end edge so that there are formed two fingers 15 which extend beyond the bent part of the tongue, the purpose of which will be hereinafter described.

Adjacent its inner end the bait pan has the trigger finger 16 struck upwardly therefrom for cooperation with a trigger member which is indicated generally by the numeral 17. This trigger member comprises an elongated substantially U-shaped wire element which is formed inwardly of each of its free ends into an eye 18 through which passes the forwardly offset portion 19 of the horizontal bar 6 of the vertical frame. This offset portion 19 which is parallel with the bar 6 and with the corner bar 8, overlies the bait pan 12, and the lower or yoke end of the trigger frame 17 is bent transversely to form the forwardly extending portion 20 which substantially parallels the bait pan 12 and is designed to receive the trigger finger 16 when the trap is set, as illustrated in Fig. 2. By the formation of the eyes 18 in the side portions of the trigger unit 17 inwardly of the ends of these members there are left the terminal fingers 21 of the trigger, which are indicated by the numeral 21 and which normally extend upwardly above the bar 6.

The numeral 22 generally designates the striker unit of the trap which comprises a relatively broad U-shaped body having the transverse yoke bar 23 and the parallel side bars or legs 24, each of which merges into a coiled spring 25. These springs 25 are disposed upon opposite sides of the sleeved end 13 of the bait pan 12 and have the corner bar 8 extended therefrom so that this bar constitutes a pintle on which the springs may be turned and tightened up and on which the bait pan 12 may oscillate. The sides 24 of the striker unit 22 join the alined coiled springs 25 at their outer or remote ends and the inner ends of these springs are extended vertically and secured to the bar portion 6 of the vertical frame, as indicated at 26.

The striker unit 22 is rectangular in outline but smaller in width and length than the frame 1 so that it may lie within the same, as illustrated in Fig. 1, and when the trap is not set, the springs 25 will hold the striker unit down with the transverse bar portion 23 thereof lying beyond the bait finger 14 and upon the terminal fingers 15 of the bait pan, the latter resting upon the base plate 9. In setting the trap, the striker 22 is swung upwardly to substantially vertical position, as shown in Fig. 2, thereby placing the springs 25 under tension. At the same time the trigger unit 17 is oscillated forwardly or backwardly as convenient so as to permit the bar portion 23 of the striker to pass beyond the offset part 19 of the vertical frame bar 6. After the portion 23 of the striker has been moved back beyond the offset 19, the trigger 17 is permitted to assume its vertical position and the bait pan 12 is raised so as to engage the trigger finger 16 in the forwardly extending yoke portion 20 of the trigger unit, the striker 22 at the same time being permitted to move forwardly against the terminal extensions 21 of the trigger so that the lower part or yoke portion 20 will be forced backwardly and will firmly engage the trigger finger 16. This will maintain the bait pan in position with its outer or free end raised from the base plate 9 as illustrated in Fig. 2, and the striker unit will be held with the springs under tension so that as soon as the pan 12 is forced downwardly so that the finger 16 will release the trigger unit 17, this unit will swing over the offset portion 19 of the bar 6 and allow the striker to descend on the animal.

It will be noted that the portion 23 of the striker always lies over the fingers 15 of the bait pan so that when an animal is to be released this can be done without touching the striker or the animal merely by placing the thumb upon the part 19 with the bait pan resting upon the first and second fingers and then forcing upwardly on the bait pan with these fingers so that the pan and the striker will be lifted together off of the base plate 9.

From the foregoing it will be apparent that a trap constructed in accordance with the present invention will be efficient in operation, inexpensive to manufacture, and may be set easily and without soiling the hands after an animal has been killed with the trap.

I claim:

1. A trap, comprising a body formed in a base portion and a vertical portion, a striker comprising a U-shaped member normally overlying the base, spring means connecting the striker with the body in the angle formed by the two portions, the striker being oscillatable to a vertical position before the vertical portion against the tension of the spring means, an elongated bait pan mounted at one end to swing co-axially with the striker, a trigger unit carried by the vertical portion and suspended for swinging movement in the same path as the pan, means carried by the trigger above the pivotal support therefor behind which the striker is engaged when in vertical position, and means frictionally coupling the trigger below its pivotal center with the bait pan when the latter is raised a predetermined distance, the engagement between pan and trigger being maintained by the engagement of the striker with the said trigger carried means, said bait pan being adapted to have the striker engage across its outer end when the trap is sprung.

2. In a trap, a base frame, a vertical frame connected therewith and having a horizontal top bar, a plate extending across the base frame, a pivot bar connecting the sides of the base where it connects with the vertical frame, a U-shaped striker having a yoke and side bars, said side bars terminating in coil springs encircling the pivot bar, the springs being held against rotation on the bar, a bait pan pivoted on the pivot bar and having a portion resting on said plate, a trigger unit comprising an elongated member oscillatably attached adjacent one end to said horizontal top bar and suspended over said pan, the portion of said unit extending above said top bar constituting a striker restraining finger, and means for frictionally coupling the lower portion of said unit with the bait pan to maintain the pan raised when the striker is engaging said finger.

3. In a trap, a base frame, a vertical frame connected therewith and having a horizontal top bar, a plate extending across the base frame, a pivot bar connecting the sides of the base where it connects with the vertical frame, a U-shaped striker having a yoke and side bars, said side bars terminating in coil springs encircling the pivot bar, the springs being held against rotation on the bar, a bait pan pivoted on the pivot bar and having a portion resting on said plate, a trigger unit comprising an elongated member oscillatably attached adjacent one end to said horizontal top bar and suspended over said pan, the portion of said unit extending above said top bar constituting a striker restraining finger, and means for frictionally coupling the lower portion of said unit with the bait pan to maintain the same raised when the striker is engaging said finger, said pan at its free end being extended to have the yoke of the striker rest thereagainst.

4. A trap comprising a body consisting of two right-angularly related frames, one of which is vertical when the trap is in use, said vertical frame having a top bar provided with a horizontally offset portion lying over the other frame, a substantially U-shaped striker pivotally joined to said frames to oscillate about a center lying in the angle formed by the frames, an elongated bait pan having one end joined to the frames to oscillate upon the same center as the striker, said pan including a bait holding means and an upwardly projecting portion lying approximately beneath the said top bar offset portion, a trigger member freely oscillatably suspended from said offset portion and having means for receiving and frictionally engaging the upwardly projecting portion of the pan, and a striker holding finger integral with the trigger member and projecting above said offset portion for engagement by the striker.

5. A trap comprising two right-angularly joined substantially U-shaped frames, the connection between the frames being at the free ends of the side portions thereof, a pivot bar connecting said joined ends, one of said frames being vertical when the trap is in use and having a top bar provided with a horizontally offset portion lying over the other frame, a substantially U-shaped spring wire striker member having the free ends of the side portions thereof merging into helical springs through which said pivot bar passes, said springs being in spaced relation and having the ends thereof remote from the sides of the striker member extending upwardly and joined to said top bar, an elongated bait pan having one end mounted between said springs on said pivot bar, said pan including a bait holding means and an upwardly projecting portion lying approximately beneath said top bar offset portion, a trigger member freely oscillatably suspended from said offset portion over the bait pan and having at its lower end a lateral extension adapted to receive and frictionally hold said upwardly projecting portion, and a striker holding finger integral with the trigger member and projecting above said offset portion for engagement by the striker.

HENRY J. MERZ.